(12) United States Patent
Sindhuber et al.

(10) Patent No.: US 12,502,094 B2
(45) Date of Patent: Dec. 23, 2025

(54) LUNG TESTING DEVICE

(71) Applicant: LUNG-DIAGNOSTICS GMBH, Linz (AT)

(72) Inventors: Gerald Sindhuber, Ulmerfeld (AT); Alfred Wegerer, Linz (AT)

(*) Notice: Subject to any disclaimer, the term of this patent is extended or adjusted under 35 U.S.C. 154(b) by 840 days.

(21) Appl. No.: 17/781,754

(22) PCT Filed: Nov. 30, 2020

(86) PCT No.: PCT/AT2020/060425
§ 371 (c)(1),
(2) Date: Jun. 2, 2022

(87) PCT Pub. No.: WO2021/108822
PCT Pub. Date: Jun. 10, 2021

(65) Prior Publication Data
US 2023/0022188 A1  Jan. 26, 2023

(30) Foreign Application Priority Data

Dec. 2, 2019 (AT) .............................. A 60266/2019
Apr. 16, 2020 (AT) .............................. A 50323/2020

(51) Int. Cl.
*A61B 5/08* (2006.01)
*A61B 5/00* (2006.01)
(Continued)

(52) U.S. Cl.
CPC ............ *A61B 5/0803* (2013.01); *A61B 5/082* (2013.01); *A61B 5/087* (2013.01); *A61B 5/091* (2013.01);
(Continued)

(58) Field of Classification Search
None
See application file for complete search history.

(56) References Cited

U.S. PATENT DOCUMENTS 5,069,220 A * 12/1991 Casparie ................ A61B 5/087
73/23.3
10,492,711 B2  12/2019 Wolfe et al.
(Continued)

FOREIGN PATENT DOCUMENTS

CN          108685575 A1    10/2018
DE      102006023837 B3     6/2007
(Continued)

OTHER PUBLICATIONS

International Search Report and Written Opinion in International Application No. PCT/AT2020/060425, mailed Mar. 12, 2021, 27 pages.

*Primary Examiner* — Jay B Shah
(74) *Attorney, Agent, or Firm* — Liang & Hennessey LLP; Brian Hennessey

(57) ABSTRACT

A device for determining measurement values describing the function of the lungs or the respiratory system of a patient includes a mouthpiece including a tube for introducing respiratory air and for sucking in air, and a gas measurement space. At least one of the following gas sensors is arranged in the gas measurement space: nitrogen monoxide sensor, carbon dioxide sensor, oxygen sensor, carbon monoxide sensor, multi-gas sensor, sensor for volatile organic compounds, alkane sensor, infrared sensor, fiber optic sensor, resistance sensor, and semiconductor sensor. The gas measurement chamber is separated by a closable opening into a first gas measurement chamber and a second gas measurement chamber, the second gas measurement chamber being closed or closable. The closable opening opens a flow path from the first gas measurement chamber into the second gas measurement chamber. A gas sensor is arranged in the second gas measurement chamber.

21 Claims, 3 Drawing Sheets

(51) Int. Cl.
  *A61B 5/083* (2006.01)
  *A61B 5/087* (2006.01)
  *A61B 5/091* (2006.01)
  *A61B 5/097* (2006.01)

(52) U.S. Cl.
  CPC .............. *A61B 5/097* (2013.01); *A61B 5/682* (2013.01); *A61B 5/0833* (2013.01); *A61B 5/0836* (2013.01); *A61B 2560/0214* (2013.01); *A61B 2560/0252* (2013.01); *A61B 2560/0257* (2013.01)

(56) References Cited

U.S. PATENT DOCUMENTS

| | | | |
|---|---|---|---|
| 2011/0009762 A1* | 1/2011 | Eichler | ............ A61B 5/085 600/532 |
| 2016/0121062 A1 | 5/2016 | Davenport et al. | |
| 2018/0140252 A1 | 5/2018 | Luxon et al. | |
| 2019/0099578 A1* | 4/2019 | Wolfson | ............ A61M 16/0891 |

FOREIGN PATENT DOCUMENTS

| | | |
|---|---|---|
| DE | 202015003822 U1 | 11/2015 |
| EP | 0017162 A1 | 10/1980 |
| EP | 0373585 A1 | 6/1990 |
| WO | 2004041084 A1 | 5/2004 |
| WO | 2008106961 A2 | 9/2008 |
| WO | 2010067244 A1 | 6/2010 |
| WO | 2012014024 A1 | 2/2012 |
| WO | 2013098714 A1 | 7/2013 |
| WO | 2017194906 A1 | 11/2017 |
| WO | 2019168479 A1 | 9/2019 |
| WO | 2019222464 A1 | 11/2019 |

* cited by examiner

LUNG TESTING DEVICE

CROSS-REFERENCE TO RELATED APPLICATIONS

The present application is a national phase application of PCT Application No. PCT/AT2020/060425, filed Nov. 30, 2020, entitled "LUNG TESTING DEVICE", which claims the benefit of Austrian Patent Application No. A 60266/2019, filed Dec. 2, 2019, and Austrian Patent Application No. A 50323/2020, filed Apr. 16, 2020, each of which is incorporated by reference in its entirety.

BACKGROUND OF THE INVENTION

1. Field of the Invention

The invention disclosed below relates to a device for determining measurement values describing a patient's pulmonary function. In a broader sense, the invention disclosed herein relates to a device for determining measurement values describing the function of a respiratory system in general, in particular of the upper airways such as the nasal cavity and the sinus, the oral cavity and the pharynx and/or the lower airways such as the larynx, the trachea, the bronchia, the bronchioles, the terminal bronchioles, the respiratory bronchioles, and the alveoli.

2. Description of the Related Art

Impulse oscillometry is known in the art. Impulse oscillometry is a method of mechanically analyzing breathing (pulmonary function testing) and is used in particular to determine the airways' resistance. In addition to the airways' resistance, it also detects the inertia and stretch resistances of the lungs and the thorax. The results may be used to diagnose airway diseases (see also the Wikipedia article on this issue).

It should be noted as part of the disclosure of the invention that pressure may have both a positive sign (area force directed onto a surface or medium) and a negative sign (area force directed away from a surface or medium).

CN108685575 describes a device for determining a gas composition of respiratory air by exerting pressure on the lung. This document fails to mention the structure of the gas sensor. CN108685575 discloses the use of a loudspeaker as a pumping device. This document fails to disclose a gas measurement space, which gas measurement space comprises a first gas measurement space and a second, spatially sealed or sealable gas measurement space with at least one gas sensor.

WO2017194906 discloses a device for determining a gas composition of respiratory air by exerting alternating resistance on the output respiratory air. This document fails to disclose a gas measurement space, which gas measurement space comprises a first gas measurement space and a second, spatially sealed or sealable gas measurement space with at least one gas sensor.

EP0017162 mentions a measuring probe inserted in a breathing bag for determining the gas composition of respiratory air. The breathing bag is not to be regarded as a spatially sealed or sealable gas measurement space.

WO2013098714 describes the determination of the gas composition of respiratory air by manipulating the air stream introduced into the device using valves. This document fails to disclose a gas measurement space, which gas measurement space comprises a first gas measurement space and a second, spatially sealed or sealable gas measurement space with at least one gas sensor.

WO2010067244 mentions the determination of the gas composition of respiratory air by taking into consideration an elasticity and resistance of the person's breath. This document fails to disclose a gas measurement space, which gas measurement space comprises a first gas measurement space and a second, spatially sealed or sealable gas measurement space with at least one gas sensor.

WO2008106961 discloses a device for determining the gas composition of respiratory air by applying pressure created by a pump to the respiratory air or the lungs. This document fails to disclose a gas measurement space, which gas measurement space comprises a first gas measurement space and a second, spatially sealed or sealable gas measurement space with at least one gas sensor.

U.S. Pat. No. 10,492,711 relates to impulse oscillometry.

WO2012014024 relates to a device for determining mechanical parameters of the respiratory tract.

DE102006023837 relates to a device for determining the alcohol level in the lungs by applying oscillating pressure on the lungs.

The above documents fail to mention the formation of a first gas measurement space and a second gas measurement space for arranging a gas sensor, the second gas measurement space being a spatially sealed or sealable space.

SUMMARY OF THE INVENTION

It is the object of the invention disclosed herein to provide a device for determining the composition of respiratory air.

The inventive device can comprise at least one of the following gas sensors as the first gas sensor and/or the second gas sensor and/or as a further gas sensor for determining the relevant measurement values: nitric oxide sensor, carbon dioxide sensor, oxygen sensor, carbon monoxide sensor, multi-gas sensor, sensors of volatile organic compounds, alkanes sensor.

The inventive device can also comprise a gas sensor, which gas sensor has properties similar to those of the gas sensors listed above by way of example. The applied gas sensor can at best be suitable to determine at least one measurement value or at least two measurement values of the following measurement values: concentration and/or level of a gas from the following group: nitric oxide, carbon dioxide, oxygen, carbon monoxide, multi-gas, volatile organic compounds (such as alkanes, alkenes, or aldehydes), alkanes.

The skilled person will be able to select a gas sensor suitable for determining the measurement values as described herein using their general knowledge in the art. The selected gas sensor can in particular be suitable for determining multiple measurement values in combination.

The gas sensor may be suitable for determining the chemical components of respiratory air and/or the presence of selected chemical components and/or the concentration of selected chemical components. The inventive device is characterized in that the mechanical measurement values of the lungs and the chemical composition of the respiratory air can be determined simultaneously, with a synergistic effect being observed between the mechanical measurement values and the chemical composition of respiratory air. Applying impulse oscillometry allows determining important parameters of the lungs or the respiratory tract. In comparison with spirometry, this method requires comparatively little patient co-operation. A pressure impulse is sent into the patient's respiratory tract, to which the respiratory tract reacts by sending an air impulse back. This provoked impulse response is recorded via the pressure sensors. Essential parameters may be calculated from the acquired measurement data.

A gas sensor from the prior art may allow measurement based on electrochemical reaction and/or chromatographic reaction.

It is the object of the invention disclosed herein to provide a device for the most exact determination possible of measurement values describing the function of a patient's respiratory system or lungs while preventing the operation of the device from affecting the measurement values, in particular from introducing air.

Advantageously, the device disclosed below allows the synchronous performing of spirometry and capnometry ($CO_2$ measurement). Additionally, a gas analysis of respiratory air is possible, allowing efficient measurements of the concentration of nitric oxides (NO) and/or oxygen ($O_2$) and/or carbon monoxide (CO).

The inventive device may be employed for the early detection and monitoring of disease progression in humans having the diseases COPD and/or asthma.

The inventive device is characterized in that the gas measurement space is spatially divided into a first gas measurement space and a second gas measurement space. This spatial division of the gas measurement space into a first gas measurement space and a second gas measurement space can be achieved by a sealable opening between, and connecting, the first gas measurement space and the second gas measurement space, which sealable opening, when exhaling and thus introducing respiratory air into the device, releases a first flow path from the first gas measurement space into the second gas measurement space and, when inhaling and thus drawing air from the device, releases a second flow path from the surrounding area into the first gas measurement space via a gas measurement space inlet.

The first gas measurement space is thus arranged upstream of the second gas measurement space in flow direction when respiratory air is introduced into the inventive device.

The sealable opening has at least the characteristic that the second gas measurement space defines an air space by the opening being in a closed position, such that no air can permeate from the surrounding area or from the first gas measurement space into the second gas measurement space. When a gas sensor is exclusively arranged as a second gas sensor in the second gas measurement space, the second gas measurement space serves exclusively as the measuring chamber.

At least a second gas sensor is arranged in the second gas measurement space. The skilled person will select a second gas sensor from the gas sensors mentioned above to be able to perform a certain measurement of the required quality.

The patient introduces their respiratory air into a second gas measurement space, which gas measurement space is defined as a sealed or sealable space, wherein the spatial sealing of the second gas measurement space is achieved via the sealable opening. By forming the second gas measurement space as a sealed or sealable space, the air volume introduced into the second gas measurement space, in particular the respiratory air introduced into the second gas measurement space, can be kept in the second gas measurement space over a defined period of time. The measurement can thus be performed on an inflowing and/or an outflowing and/or a resting air volume, in particular on respiratory air, using the second gas sensor.

The mouthpiece may be regarded as the first gas measurement space. This allows a small, compact formation of the inventive device.

A first gas sensor may be arranged in the first gas measurement space, so that a measurement using said gas sensor may be performed on a flowing air volume. The skilled person will select a suitable first gas sensor from the gas sensors mentioned above.

The inventive device may also comprise a further gas sensor in the mouthpiece.

The skilled person will select the further gas sensor from the gas sensors mentioned above to be able to perform the desired measurements of the desired quality.

The mouthpiece may form the first gas measurement space.

According to the present technology, the mouthpiece may comprise a viral filter, which viral filter prevents the permeation of viruses and/or bacteria into the gas measurement space. In order to nevertheless be able to determine said viruses and/or bacteria in the respiratory air introduced into the inventive device using said inventive device, the mouthpiece may comprise a suitable gas sensor for detecting viruses and/or bacteria present in respiratory air upstream of the viral filters and/or bacterial filters arranged in the mouthpiece as seen in the flow direction of the respiratory air introduced into the inventive device.

The functionality and potential formation of the gas sensor have been described above. The gas sensor may in particular comprise an infrared sensor and/or light wave sensor and/or resistance sensor and/or semiconductor sensor.

The inventive device may be characterized in that the gas sensor has a carrier body with a carrier body surface, on which carrier body surface isolated tracks with a track surface are arranged, on which track surface a measurement body comprising tetracosane and a binder comprising acrylic copolymer, polyurethane polymer is arranged.

The measurement body is exposed to the fluid to be measured, whereby the measurement body changes its electric resistance or electric conductivity. When applying electricity to the performing path, the changes in the measurement body's electric properties may be determined.

The gas sensor described above may be prepared by applying to the conducing path surface acetylene carbon black (CAS No.: 7440-44-0), tetracosane (CAS No.: 646-31-1) and, as binders, acrylic copolymer, polyurethane polymer, ethanol, water, dimethyl ether.

The gas sensor may comprise

8% acetylene carbon black (CAS No.: 7440-44-0),

12% tetracosane (CAS No.: 646-31-1), and

80% of the binder comprising acrylic copolymer, polyurethanepolymer, ethanol, water, dimethyl ether is applied, where in subsequent evaporation of acetylene, ethanol, water, dimethyl ether occurs.

The above gas sensor does by no means need to be part of the inventive device. The gas sensor may also be part of devices other than the inventive device or work as a stand-alone gas sensor.

The gas sensor may react to various components of respiratory air. Mention may be made of volatile organic compounds such as alkanes and/or alkenes and/or aldehydes, to which mentioned components said gas sensor may react. The gas sensor changes its electric conductivity or its electric resistance depending on the presence of the mentioned components and/or depending on the concentration of the mentioned components, which is measurable via feeding the isolated performing path with electricity.

Volatile organic compounds are more frequent in the respiratory air of patients with a lung carcinoma than in healthy patients.

The inventive device may allow measuring air impulse measurement values, which air impulse measurement values describe the air impulse volume introduced into the gas measurement space using the pumping device and/or by inhaling or exhaling.

The inventive device may be characterized in that pressure sensors or flow sensors are arranged in the first gas measurement space and/or in the second gas measurement space, using which pressure sensors or flow sensors air impulse measurement values describing the air impulse volume introduced into the gas measurement space by inhaling or exhaling can be determined.

Direct measurement of the air impulse measurement values in via at least one pressure sensor, which pressure sensor measures the fluid pressure. The pressure sensor may be arranged in the gas measurement space or be in fluid communication with the fluid kept in the gas measurement space. The pressure sensor may, for example, be arranged in the first gas measurement space.

Determining the pressure in the gas measurement space may also be via indirect measuring methods such as, for example, measuring a deformation of a sub-area of the gas measurement space. Direct and indirect measurement methods may also be combined.

The spatial division of the gas measurement space into a first gas measurement space, with which first gas measurement space the pumping device is in direct fluid communication, and a second gas measurement space, which second gas measurement space is separated from the first gas measurement space and the pumping device and thereby from the direct action of the pumping device by the sealable opening, allows arranging the pressure sensor in the first gas measurement space and arranging the gas sensor in the second gas measurement space. This spatially separated arrangement of pressure sensor and gas sensor allows the efficient performing of measurements on the mechanical functionality of the lungs and the chemical composition of the respiratory air.

The invention disclosed herein relates to the determination of a disease of a patient's lungs or respiratory tracts, wherein the lung releases particular subsets of respiratory air under pressure in general and/or under oscillation pressure in particular. The invention is exclusively direct to the inventive device and to testing respiratory air. At the time of crafting this document, the skilled person assumes that the inventive device is suitable for detecting diseases such as COPD, fibroses, asthma, lung cancer, viruses, bacteria and by extension infections of sub-areas of the airways and/or preliminary stages of those diseases. No claim is made as to the list of diseases detectable using the inventive device given here by way of example being exhaustive; the skilled person is aware of further diseases with symptoms similar to those of the diseases listed here by way of example.

For example, there is initial evidence of lung cancer being detectable using, among other means, sensors for volatile organic compounds. To perform such a test, respiratory air is applied to said sensor for volatile organic compounds in such a manner that the respiratory air to be tested surrounds the sensor. As elaborated above, the inventive device may comprise a sensor for volatile organic compounds as a gas sensor.

While developing the inventive devices discussed herein, the efficiency and/or validity and/or accuracy of measurements with the inventive device were also tested. It is shown that carbon monoxide sensors, which carbon monoxide sensors are arranged in the inventive device, allow for a more accurate determination of metabolic carbons in the respiratory air applied to the sensor and/or also a determination of smaller amounts of metabolic carbons in the respiratory air applied to the sensor than, for example, an alkanes sensor would allow. This allows more accurate and/or more efficient determination of lung cancer.

The more accurate and/or more efficient determination of lung cancer described herein may be based on the carbon monoxide sensor arranged in the inventive device being suitable not exclusively for determining a presence of carbon monoxide.

The device may be characterized in that the device comprises a pumping device, which pumping device is in fluid communication with the gas measurement space for introducing an air impulse volume into the gas measurement space.

The pumping device causes movement and/or compression of a fluid kept in the gas measurement space. This may be accomplished by moving a piston or by deforming a container defining the gas measurement space. The movement of the piston and/or the deformation of the gas measurement space, in particular of a shell of the gas measurement space is preferably performed in an oscillating manner.

When pressure sensors or flow sensors are arranged in the gas measurement space, the air impulse values describing the air impulse volume introduced into the gas measurement space using the pumping device can be determined.

The pressure sensor and/or the flow sensor may be arranged in the first gas measurement space such that the air impulse created by the pumping device is determinable based on air impulse measurement values using the pressure sensor and/or flow sensor arranged in the first gas measurement space.

The device disclosed herein may thus be based on a combination of one spirometer or one impulse oscillometer with a gas measurement device.

Multiple gas sensors may be arranged in the gas measurement space. The skilled person may select a number of gas sensors for performing a certain number of measurements over a certain period of time.

The pumping device may comprise a membrane compressor, which membrane compressor comprises a compressor volume connected to the gas measurement space, which compressor volume is compressible by a membrane that can be set in membrane oscillation.

A potential embodiment of the pumping device is a loudspeaker or a device similar to a loudspeaker, which is preferably in fluid connection with the gas measurement space by forming a fluid-tight area. The formation of the fluid-tight area may be defined to certain fluid pressures.

The inventive device maybe characterized in that the membrane oscillation is 1-50 Hz, preferably 1-32 Hz, but can be operated at a higher frequency in special cases.

The pumping device may comprise a rotary vane pump with a rotor and/or a piston pump with a piston, which pumping device comprises a compressor volume connected to the gas measurement space, which compressor volume is compressible by rotation of the rotor or by movement of the piston, respectively.

A displacement volume of at most 100.0 milliliters, preferably 40.0 milliliters, can be introduced into the gas measurement space via the third opening.

The given frequencies and displacement volume are the frequencies typically employed in impulse oscillometry. The skilled person may intend a different frequency or displacement volume by changing the size of the pumping device in order to provoke the patient's respiratory tract to release particular subsets of respiratory air. The frequencies and displacement volume given above were employed in testing procedures.

Formation of the pumping device piston as a membrane, which membrane is set into oscillation or moved into a final position, has the advantage of allowing a relatively large fluid volume to be moved with a relatively small mass. Undesired vibrations in the inventive device can thus be avoided.

The sealable opening may be formed as a valve and/or check valve. The skilled person may provide further sealable openings from the prior art in order to form the second gas measurement space as a sealed or sealable space. The skilled person may also provide an opening sealable by a drive and/or control.

Additionally or alternatively to the formation as a valve and/or check valve, the sealable opening may comprise a gas measurement space pumping device.

In the prior art, a pumping device in general comprises a piston, which piston is movable into a piston space. The inventive device may be characterized in that the movable piston is used for opening or closing the sealable opening. To do so, the piston is brought into a position releasing a passage between the first gas measurement space and the second gas measurement space or into a position preventing such passage.

Formation of the sealable opening as a gas measurement space pumping device further allows introducing a defined amount of air from the first gas measurement space into the second gas measurement space. In the prior art, this amount of air can be defined by moving the piston. Introducing a defined amount of air into the second gas measurement space allows increasing the quality of the measurement using the second gas sensor. Applying a defined amount of air to the gas sensor has the particular advantage of allowing the measurement to be repeated in a certain quality.

The inventive device may be characterized in that the sealable opening, when inhaling and thereby drawing air from the device, releases a second flow path from a gas measurement space inlet in fluid communication with the surrounding area into the first gas measurement space.

The skilled person can achieve this by arranging a valve and/or check valve and/or gas measurement space pumping device in the sealable opening.

While the mechanical functionality of the lungs or respiratory system and the chemical composition of respiratory air do have synergistic effects, the spatially divided arrangement of measurement means such as the gas sensor, pressure sensors, flow sensors allows performing measurements, which measurements take into consideration the properties of the pressure sensor and the gas sensor prior to, during, and after performing the measurement.

The mechanical functionality of the lungs is determined by the pressure sensors. This measurement typically does not take long since a pressure sensor usually reacts quickly and requires little to no compensation time.

The required measurement for determining the chemical composition of respiratory air is performed in the second or any of the gas measurement spaces. A gas sensor from the prior art requires a compensation phase after the respiratory air has been applied to it. The spatial division into the first gas measurement space and the second gas measurement space has the advantage of allowing the patient to exclusively inhale via the first gas measurement space while the second gas sensor located in the second gas measurement space is granted sufficient time for compensation.

The inventive device may be characterized in that a mouthpiece comprises a viral filter.

The skilled person used a filter-free mouthpiece for determining viruses and/or bacteria in respiratory air using the gas sensors.

The inventive device may be characterized in that the mouthpiece comprises an air dehumidifier.

The humidity of exhaled air is very high. To prevent measuring errors and also damage to the inventive device, the liquid from the respiratory air should be removed as completely as possible. Essentially, humidity in respiratory air should be lowered until no condensate can form in the measurement means. The skilled person may estimate such maximum humidity in respiratory air based on their knowledge in the art.

The viral filter and the air dehumidifier may be formed integrally.

The mouthpiece, in particular the integrally formed viral filter and dehumidifier may be replaced after introducing respiratory air into the inventive device or after a certain number of introductions of respiratory air into the inventive device.

The inventive device may be characterized in that the device comprises a first temperature sensor arranged in the first gas measurement space and/or a second temperature sensor arranged in the second gas measurement space.

The temperature of respiratory air in the first gas measurement sensor is determinable by means of the first temperature sensor. To do so, the first temperature sensor may be arranged in immediate proximity to the pressure sensor if the inventive device comprises such a pressure sensor.

The temperature of respiratory air in the second gas measurement sensor is determinable using the second temperature sensor. To do so, the second temperature sensor may be arranged in immediate proximity to the gas sensor, so that the temperature is determinable over the duration of the gas measurement and/or compensation of the gas sensor. Optionally, the compensation status of the gas sensor can also be determined via the second temperature sensor.

In one arrangement of the first temperature sensor and the second temperature sensor, a temperature difference can also be determined.

The inventive device can comprise a first humidity sensor arranged in the first gas measurement space and/or a second humidity sensor arranged in the second gas measurement space.

In analogy to the arrangement of temperature sensors shown above, the humidity sensors may be arranged in immediate proximity to the pressure sensor and the gas sensor, respectively. The skilled person may also provide sensors, via which sensors a temperature of respiratory air and a moisture content of respiratory can be determined in combination. In one arrangement of the first humidity sensor and the second humidity sensor, a humidity difference can also be determined.

The inventive device may comprise
  a pressure sensor for determining the ambient barometric pressure of the surrounding area of the device and/or
  a gas sensor for determining the gas composition of the ambient gas of the surrounding area of the device and/or
  a temperature sensor for determining the ambient temperature of the surrounding area of the device and/or a humidity sensor for determining the ambient humidity of the surrounding area of the device.

The sensors given above are suitable for determining parameters, using which parameters the condition of the surrounding area of the inventive device can be described. The skilled person will recognize that, to do so, said sensors must be at least in interaction with the surrounding area of the inventive device to be able to perform such a measurement. Said sensors may also be arranged in the surrounding area. Preferably, said sensors are arranged on outer surfaces of the inventive device.

The pumping device may be controlled depending on the ambient barometric pressure. The pumping device may, for example, create pressure in the first gas measurement space and thus fluid pressure in the patient's lungs, which pressure and fluid pressure in the lungs differ from the ambient barometric pressure by a pressure difference. The pressure difference may be a pre-set value or set depending on the ambient barometric pressure and/or the disease to be determined.

The inventive device may be characterized in that substances with a medical effect, a liquid, an air contaminant, can be introduced via the gas measurement space inlet.

The medical substances introduced into the inventive device may have an effect on the airways, in particular the lungs, and thereby on the behavior of the airways, in particular the lungs. For example, the skilled person is aware of asthma agents and agents for specific and non-specific bronchial provocation, which agents the skilled person may introduce into the device via the gas measurement space inlet and into the patient's airways via the inventive device.

The skilled person may introduce into the device a liquid for enriching the air.

The skilled person may also introduce an air contaminant directly into the air drawn via the device.

The inventive device may be characterized in that the introduced medical substances and/or the introduced liquid and/or the introduced contaminant can be analyzed using the gas sensors. Introduction into the patient's airways may be reinforced via the pumping device, which in turn can be measured and controlled using the pressure sensors.

The inventive device may comprise a heating device and/or a cooling device, each arranged in the gas space inlet, for respectively heating or cooling the air introduced into the gas measurement space and/or the sensors. The temperature of the air introduced into the patient's airways may thus be controlled while determining a reaction of the airways, in particular the lungs, to the introduced air at a certain temperature.

The sensors used, such as gas measurement sensors, temperature sensors, pressure sensors, etc., may have a particularly high measurement accuracy at a certain temperature range. It may therefore by required to respectively heat or cool parts of the inventive device, such as, for example, the above sensors or the entire device, to a certain temperature range. The skilled person will choose said temperature range depending on the properties of the sensors employed.

Advantageously, those parts of the inventive device which are surrounded by the introduced respiratory air will be heated.

The inventive device may be characterized in that the device comprises a data communication means for transferring the data determined using the sensor to a data processing apparatus.

The inventive device functions to determine the measurement values using the above gas sensors and/or other measurement device. Listed above as further measurement devices are, for example, pressure sensors, flow sensors, humidity sensors.

The inventive device may be limited to determining the measurement values and to transferring said measurement values to a data processing apparatus.

The inventive device may be characterized in that the device comprises a counter.

The quality of the measurement performed using a gas sensor may decrease with the number of performed measurements in particular and/or with the number of introductions of respiratory air into the inventive device. The mentioned decrease in measurement quality can be observed with gas sensors in general and with the gas sensors mentioned above in particular, which gas sensors are comprised in the inventive device as first gas sensors and/or second gas sensors and/or further gas sensors.

It may be determined by means of the counter how often a patient or patients introduce respiratory air into the inventive device and/or how often respiratory air is applied to a gas sensor. The application of respiratory air to a gas sensor may be independent of a measurement with a gas sensor, i.e., respiratory air may be applied to the gas sensor and a gas measurement or no gas measurement may be performed.

The counter may be integrated into the inventive device and/or into the data processing apparatus.

The inventive device, in particular the sensors of the inventive device, may be replaced once a threshold value for an application of respiratory air to the gas sensor and/or a number of uses of the inventive device is reached.

The possibility of replacing the device or the sensors may have the advantage that certain sensors, in particular certain gas sensors, are selected. Furthermore, a software update may be performed.

The device described herein may be a portable apparatus.

The invention disclosed herein also relates to a method of determining at least one of the following diseases by applying the inventive device: infection of the lungs, COPD, fibroses, asthma, lung cancer, and infection of sub-areas of the patient's airways.

The inventive method may also comprise that multiple pressure differences of a pressure difference range are created using the pumping device, for example, for detecting multiple diseases.

The inventive method may comprise that the above sensors, in particular the above gas sensor, are heated.

The invention disclosed herein also relates to a computer-implemented method which is based on the comparison of patterns of measurement values. For example, the patterns of measurement values of a healthy person and the patterns of measurement values of a diseased person may be applied. Furthermore, the patterns of measurement values of a person during a measurement at a first point in time and the patterns of measurement values of said person or another person during a measurement at a second point in time may be compared.

The inventive device and/or the inventive method are particularly suitable for monitoring a person in quarantine.

The skilled person will recognize that, in doing so, prior-art methods of data analysis, such as methods of artificial intelligence, may be employed.

The invention disclosed herein also relates to a computer program product comprising commands, which commands cause a computer to perform the method described above.

The requested subject matter of protection also comprises a storage medium, on which storage medium the computer program is stored.

BRIEF DESCRIPTION OF THE DRAWINGS

The invention is additionally explained based on the following embodiments represented in the Figures.

DETAILED DESCRIPTION

Figure 1:
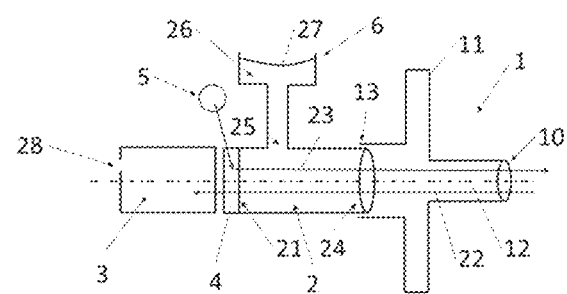
FIG. 1 shows a schematic representation of an embodiment of the inventive device.

The embodiments shown in the Figures merely show potential embodiments, while it should be remarked at this point that the invention is not limited to those specially represented variant embodiments, but combinations of the individual variant embodiments as well as a combination of one embodiment with the broad description given above are possible. These further potential combinations do not need to be explicitly mentioned, since these further potential combinations are within the skill of the artisan based on the teaching on technical activity by the present invention.

The scope of protection is defined by the Claims. The description and the drawings, however, are to be used in interpreting the Claims. Individual features or combinations of features from the various embodiments shown and described may present themselves for autonomous inventive solutions. The object underlying the autonomous inventive solutions can be seen from the descriptions.

In the Figures, the following elements are designated by the reference numerals preceding them:

1 mouthpiece
2 first gas measurement space
3 second gas measurement space
4 valve
5 gas measurement space inlet, vents
6 pumping device
10 free end of mouthpiece 1
11 disc
12 axis of extension
13 connected end of mouthpiece 1
21 first opening of gas measurement space
22 first flow path
23 second flow path
24 second opening of gas measurement space
25 third opening of gas measurement space
26 pumping container
27 piston
28 gas measurement space outlet, fourth opening
29 switching edge
30 charging plug
31 control unit
32 data communication means
33 gas measurement space pumping device
34 seal
35 gas measurement sub-space
36 first pressure sensor
37 first emitter
38 first detector
39 check valve
40 second pressure sensor
41 second gas measurement sensor FIG. 1 shows a potential embodiment of the inventive device, with merely the functional elements of the device being represented in FIG. 1.

A patient introduces their respiratory air into the device via a mouthpiece 1. The mouthpiece 1 forms a fluid channel formed by a tube, which fluid channel extends from the free end 10 of the mouthpiece 1 to the connected end 13 of the mouthpiece 1. The fluid channel is defined by the mouthpiece 1 and extends essentially in a straight line.

To do so, the patient encloses the free end 10 of the mouthpiece 1 with their lips. The free end 10 of the mouthpiece 1 has a shape known in the art or one that can be derived from the known prior art. The free end 10 comprises and opening with a circular or elliptical cross section, with other forms also being possible. The open cross section of the free end 10 clearly defines a cross section having a cross section size, via which cross section the respiratory air is introduced into the device when exhaling.

Furthermore, the mouthpiece 1 comprises a disc 11, which disc 11 serves as a spacer. The patient firmly encloses the nozzle upstream of the disc in the direction of the free end 10 (not shown in FIG. 1). Thus, an air-tight connection between the inventive device and the patient is created.

The disc 11 has a disc surface, which disc surface is oriented essentially perpendicularly to the axis of extension 12 of the mouthpiece 1. The sealing between mouthpiece 1 and the lips can be an essential prerequisite for efficiently introducing fluid pressure into the patient's lungs, so that certain subsets of respiratory air can be released from the lungs via a lung pressure created by the fluid pressure.

The mouthpiece 1 may comprise a filter, which filter is arranged inside the mouthpiece 1. The filter may be suitable for filtering selected bacteria and/or selected viruses. The filter may also be suitable for filtering essentially all bacteria known according to the current teaching and/or essentially all viruses known according to the current teaching. The filter may also be suitable for removing the liquid present in the introduced respiratory air from said respiratory air; the filter may therefore act as a dehumidifier.

When the presence of viruses and/or bacteria in respiratory air is to be determined using the inventive device, the skilled person will use a mouthpiece 1 without a filter.

A further gas sensor for determining measurement values describing the respiratory air introduced into the inventive device may also be arranged in the mouthpiece 1.

The skilled person may, for example, provide a mouthpiece 1 known in the art, such as CareFusion, optionally with the MICROGARD® II TYPE B, BACTERIAL/VIRAL FILTER/V-892380 filter. The filter has the effect that no bacteria and/or viruses damaging to further patients are introduced into the device and can be absorbed by such further patients.

The filter may be arranged inside the disc 11.

The mouthpiece 1 may have a smaller cross section at its free end 10 than at its connected end 13.

The connected end 13 of the mouthpiece 1 is connected to a first gas measurement space 2. The mouthpiece 1 is removable connected, with the mouthpiece 1 simply being pushed onto an inlet tube of the first gas measurement space 2 in the embodiment represented in FIG. 1. The exact formation of the connection of the mouthpiece 1 to the first gas measurement space 2 has no essential influence on the inventive device, if the connection allows fluid communication and seals tightly against the surrounding area.

The bacteria and/or viruses accumulated in the filter are thus unable to harm a further patient. Each mouthpiece 1 is used for a single patient.

A valve 4 is arranged at a first opening 21 of the first gas measurement space 2, which valve 4, when exhaling and thus introducing respiratory air into the first gas measurement space 2, forwards the respiratory air into a second gas measurement space 3 (first flow path 22). When the patient inhales or takes in air from the device, the air is taken in via a gas measurement space inlet 5 optionally provided with ventilation slots (second flow path 23). The valve 4 thus switches the fluid communication between the second gas measurement space 3 and the mouthpiece 1 (first flow path 22) one the one hand and the gas measurement space inlet 5 and the mouthpiece 1 on the other (second flow path 23) depending on the flow direction in the first gas measurement space 2. The valve 4 is arranged at the intersection between the first gas measurement space 2, the vents 5, and the second gas measurement space 3.

The valve 4, which valve 4 forms a sealable opening connecting the first gas measurement space 2 and the second gas measurement space 3, may, for example, be formed as a check valve. The check valve may be executed as a membrane check valve, but it is in the skill of the artisan to intend to use a different means.

The mouthpiece 1 is connected to a second opening 24 of the first gas measurement space 2. Fluid communication between the mouthpiece 1 and the first gas measurement space 2 is thus created via the second opening 24. The second opening 24 merges into the inlet tube, onto which inlet tube the mouthpiece 1 is pushed. FIG. 1 shows a particular case in which the mouthpiece 1 is directly connected to the first gas measurement space 2. A further element may also be connected between the first gas measurement space 2 and the mouthpiece if the fluid communication between the first gas measurement space 2 and the mouthpiece is maintained. The angle of the mouthpiece 1 to the first gas measurement space 2 may, for example, be set via the further element.

A pumping device 6 may be connected to a third opening 25 of the first gas measurement space 2 in fluid communication with the first gas measurement space 2. The fluid pressures in the first gas measurement space 2 may be controlled using the pumping device 6. The pumping device 6 may create both excess pressure and negative pressure in the first gas measurement space. The skilled person will recognize that the temporary excess or negative pressure created in the first gas measurement space 2 affects the patient's lungs when fluid communication is established with the patient's oral space via the mouthpiece 1, since the patient sealingly encloses the free end 10 of the mouthpiece 1 with their lips.

In the prior art, a pumping device 6 is connected in the first gas measurement space 2 by means of the pressure measurement means.

FIG. 1 shows a particular case in which the pumping device 6 is directly connected to the first gas measurement space 2. The pumping device 6 comprises a pumping container 26, with the fluid volume present in the pumping container 26 being compressible or decompressible by moving the piston 27.

A pressure sensor may be arranged in the first gas measurement space 2. Fluid pressures in the first gas measurement space 2 may be determinable by means of the pressure sensor arranged in the first gas measurement space 2 following inhaling by the patient or exhaling by the patient or following a change in fluid pressure caused by the pumping device 6. The fluid pressure changes following inhaling or exhaling are also measurable in combination with the fluid pressure change caused by the pumping device 6.

The fluid pressure maintained over a period of time can be measured by means of the pressure sensors arranged in the first gas measurement space 2. Furthermore, air impulse measurement values can be determined, which air impulse measurement values describe the air impulse volume introduced into the first gas measurement space 2 using the pumping device 6 or the air impulse volume introduced by inhaling or exhaling, optionally in combination with the pumping device 6.

In a testing device, BMP280 sensors by Bosch were employed as pressure sensors.

In place of the pressure sensor or in addition to the pressure sensor, a flow sensor may also be arranged in the first gas measurement space 2, via which flow sensor the flow rate of the fluid in the first gas measurement space 2 can be determined. It is noted that, based on the Hagen-Poiseuille equation, in laminar flow, the flow rate can be determined from the fluid pressure, and vice versa.

The skilled person will recognize that, when measuring a fluid pressure change in the first gas measurement space 2 caused exclusively by inhaling and exhaling, the piston 27 is to be brought into a defined position.

Second gas sensors for determining the fluid present in the second gas measurement space 3 are arranged in the second gas measurement space 3. The fluid present in the second gas measurement space 3 is thus tested with respect to the chemical components of the fluid by means of the second gas sensors. The details of a such test depend on the gas sensors employed.

The embodiment of the inventive device shown in FIG. 1 is thus characterized in that the pressure sensors for determining the fluid pressures are arranged in the first gas measurement space 2 and the second gas sensors for determining the components of the fluid are arranged in the second gas measurement space 3. The pressure sensors and the second gas sensors are thus spatially separated. In the embodiment shown in FIG. 1, said spatial separation is accomplished by the valve 4. The skilled person may, additionally or alternatively to the valve 4, provide further means of separation, which means of separation may, for example, be the temporary sealing on an opening or channel, which opening or channel connects the first gas measurement space 2 and the second gas measurement space 3. In the exemplary embodiment discussed based on FIG. 1, the valve 4 acts as a temporary means of separation.

Merely the exhaled respiratory air, i.e., which is introduced into the device by exhaling, is to be determined using the second gas sensors. The air introduced into the device when inhaling does not necessarily have to be determined using the gas sensors, since the components of said air are essentially known.

The pressure ratios both when inhaling and when exhaling are to be determined using the pressure sensors.

Gas sensors in the prior art have the property of requiring a compensation period after performing a measurement. Arrangement of the pressure sensors in the first gas measurement space 2 allows measuring the fluid pressure during inhaling and during exhaling. Arrangement of the second gas sensors in the second gas measurement space 3 allows the exclusive determination of the components of exhaled air. The gas sensors may compensate during inhalation.

The skilled person may also arrange first gas sensors in the first gas measurement space 2, however, in the case of such an arrangement of first gas sensors in the first gas measurement space 2, the advantage described above regarding compensation for the gas sensors arranged in the first gas measurement space 2 would be waived.

The gas sensors and pressure sensors are not shown in FIG. 1.

An air impulse can be introduced into the first gas measurement space 2 using the pumping device 6 during inhaling and/or during exhaling. Since the first gas measurement space 2 is in fluid communication with the patient's lungs via the mouthpiece 1, the fluid pressure in the patient's airways, in particular in their lungs, can be changed via the pumping device 6.

In the device represented in FIG. 1, the pumping device 6 has a displacement volume of about 40 ml and a pumping rate of at most 32 Hz. These parameters are typical in impulse oscillometry according to the current teaching. The skilled person may also choose other parameters and thereby achieve particular effects with respect to measurement and effect on properties of the lungs if this is known from the current teaching.

In the embodiment shown in FIG. 1, the pumping device 6 is formed in the shape of a membrane compressor. A membrane that can be set in motion thus acts as the piston 27 of the pumping device 6.

The membrane can be set in oscillating motion, thus exerting an oscillating air impulse on the first gas measurement space 2. The pumping device 2 comprising an oscillating membrane as the piston 27 may be formed by a loudspeaker. The loudspeaker or an oscillating membrane in general has the advantage that only small masses are moved and thus no undesired vibrations or impulses are exerted on the inventive device.

The membrane can also be brought in a final position and kept in said final position for a length of time, whereby a one-time air impulse in exerted on the first gas measurement space 2.

The inventive device comprises an electronic system and electronic components such as microcontrollers, analog-digital converters, amplifier circuits, processors, computers, and memories. Furthermore, a battery may also be provided to secure constant voltage supply for the sensitive evaluating system.

Advantageously, the battery may also comprise for securing constant voltage supply for the sensitive evaluating system such as, for example, the nitric oxide sensor as a gas sensor. In this way, stabilizing time following activation can be reduced, since the sensors supplied with constant voltage are permanently settled.

The inventive device may also comprise means of data transfer.

At least one second gas sensor for determining the chemical components of the fluid introduced into the second gas measurement space 3 is arranged in the second gas measurement space 3. When fluid communication between the mouthpiece 1 and the second gas measurement space 3 is maintained and sealed, the fluid introduced into the second gas measurement space 3 equals the air exhaled from the patient's lungs.

The inventive device comprises at least one of the following gas sensors: nitric oxide sensor, carbon dioxide sensor, oxygen sensor, carbon monoxide sensor, multi-gas sensor, and/or sensors of volatile organic compounds such as alkanes sensor, alkenes sensor, aldehydes sensor.

The second gas measurement space 3 comprises a sealable fourth opening 28 as a gas chamber outlet. The fourth opening 28 is sealed using a gas sensor while a measurement is performed, in order to prevent the respiratory air to be measured from leaking from the second gas measurement space 3. After a measurement has been performed, the fourth opening 28 can be opened to allow the respiratory air previously measured in the second gas measurement space 3 to exit.

The skilled person may provide in the fourth opening 28 a fan, which fan drives out the air present in the second gas measurement space 3.

The fourth opening 28 may also comprise a further valve, which further valve is opened due to the existing pressure when fresh respiratory air is introduced into the second gas measurement space 3, in order to enable replacement of the air kept in the second gas measurement space 3 with the fresh respiratory air.

In a trial device, the second gas measurement space 3 has a second gas measurement space volume of about 160.00 $cm^3$.

The skilled person may establish the first gas measurement space volume depending on the air volume introducible into the inventive device by a patient minus the volume of the second gas measurement space 3.

The first gas measurement space volume may be smaller than the second gas measurement space volume. This has the advantage that the patient, following an exhaling procedure in which they have introduced their respiratory air into the inventive device, introduces a larger amount of respiratory air into the second gas measurement space 3 and thus does not come into contact with most of their respiratory air following the exhaling procedure. This also means that the patient is unable to inhale back most of their respiratory air introduced into the inventive device when inhaling and thus taking in air through the inventive device.

The skilled person may thus choose the first gas measurement space volume such that the air volume taken in from the first gas measurement space 2 when inhaling does not affect the following measurements and thus most of the inhaled air volume is taken from the surrounding area via the ventilation slots 5.

The skilled person may choose the first gas measurement space volume to be as small as possible. In the testing device mentioned above, the first gas measurement space volume has a size of about 250.0 $cm^3$, in a modification of 160.0 $cm^3$.

Figure 2:
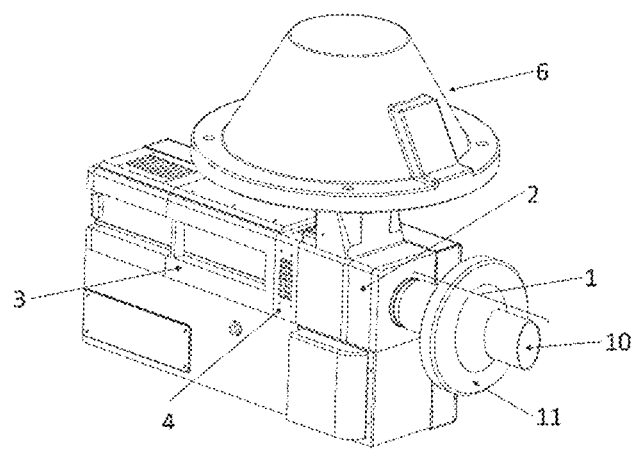
FIG. 2 shows a three-dimensional section of the embodiment of the inventive device represented schematically in FIG. 1.

FIG. 2 shows a section of the embodiment of the inventive device represented in FIG. 1. The above description given for FIG. 1 is to be applied mutatis mutandis on FIG. 2.

The embodiment shown in FIG. 1 and FIG. 2 is characterized in that the first gas measurement space 2 and the second gas measurement space 3 are spatially separated.

Figure 3:
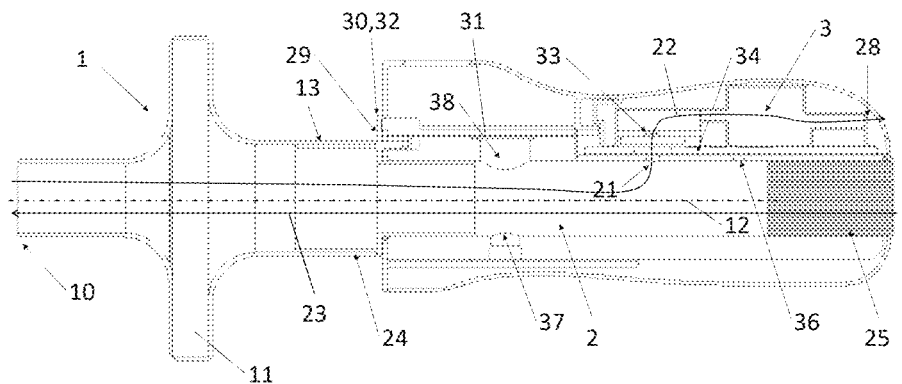
FIG. 3 shows a further embodiment of the inventive device for determining measurement values describing a patient's pulmonary or respiratory system function.

FIG. 3 shows a further embodiment of the inventive device for determining measurement values describing a patient's pulmonary or respiratory system function.

The device shown in FIG. 3 comprises a mouthpiece 1 comprising a tube for introducing respiratory air and taking in air. The tube comprises a disc 11, which disc 11 is, in its planar extension, arranged at a right angle with respect to the longitudinal axis of the tube.

The patient brings the free end 10 of the mouthpiece 1 into their oral space. The patient's lips enclose the free end 10. In this manner, the patient can easily create a tight connection between the mouthpiece 1 and their lips, thus guaranteeing that the respiratory air is introduced into the mouthpiece 1 and thereby into the gas measurement space downstream from it as seen in flow direction.

A filter may be arranged inside the disc. The device may have arranged a viral filter and/or bacterial filter and/or a filter for removing the liquid present in respiratory air.

Typically, respiratory air has a high liquid content; however, the liquid present in the respiratory air may damage the inventive device or affect the quality of the measurement. Therefore, humidity is extracted from the respiratory air using a suitable filter in the mouthpiece 1.

The device comprises a gas measurement space 2, 3, which gas measurement space is in fluid communication with the mouthpiece 1. The patient introduces respiratory air into the gas measurement space 2, 3 via the tube of the mouthpiece 1. Preferably, the gas measurement space 2, 3 and the mouthpiece 1 are arranged along an axis of extension 12, so as not to be subjected to any flow losses and to form an air flow as laminar as possible. The mouthpiece 1 and the gas measurement space 2, 3 may have a circular or other cross section, so that the parts can be easily plugged into each other.

The mouthpiece 1 has a connected end 13 facing away from the free end 10, which connected end 13 is connected to the second opening 24 of the gas measurement space 2, 3 in an air-tight manner The connection is achieved, for example, via a detachable plug connection sealing tight against the surrounding area of the inventive device. A switching edge 29 arranged in the area of the second opening 24 can be used to check whether the mouthpiece, optionally including the filter, is correctly connected to the second opening 24 of the gas space 2, 3. If using the inventive device is exclusively intended with mouthpieces 1 comprising a filter 1, it can be checked via the switching edge 29 whether a mouthpiece 1 is plugged onto the gas measurement space 2, 3. Unintentional contamination of the device, in particular of the gas measurement space 2, 3, due to a use without a mouthpiece can thus be prevented.

The longitudinal axis of the tube of the mouthpiece and the first gas measurement space 2 are oriented along an axis of extension 12.

The inventive device may have a battery for supplying the electrical and electronical apparatus with electric energy. Preferably, the plugged-on mouthpiece seals a charging plug 30 for charging the battery, so as to prevent charging of said battery while measurements are performed. The charging plug 30 is connected to a control unit and can serve as a data communication means 32 in addition to delivering power to the battery. Data such as measurement values, for example, may be stored in or loaded from the control unit 31 via the data communication means 32. Furthermore, the software stored in the control unit 31 can be changed.

At least one of the following gas sensors for determining there levant measurement values is arranged in the gas measurement space 2, 3:

nitric oxide sensor, carbon dioxide sensor, oxygen sensor, carbon monoxide sensor, multi-gas sensor, sensor of volatile organic compounds (such as alkanes sensor, alkenes sensor, aldehydes sensor), alkanes sensor, infrared sensor and/or light wave sensor and/or resistance sensor and/or semiconductor sensor.

The inventive device is characterized in that the gas measurement space is spatially divided into a first gas measurement space 2 and a second gas measurement space 3 by a sealable opening. The sealable opening, when exhaling and thus introducing respiratory air into the device, releases a first flow path 22 from the first gas measurement space 2 into the second gas measurement space 3.

The spatial separation between the first gas measurement space 2 and the second gas measurement space 3 is such that the air volume locked in the second gas measurement space 3 can be separated from the first gas measurement space 2 and from the surrounding area of the inventive device.

At least one second gas sensor is arranged in the second gas measurement space 3. The respiratory air introduced into the second gas measurement space 3 can be released via a fourth opening 28. In the sense of the separation of the air volume locked in the second gas measurement space 3 as mentioned above, the fourth opening is formed as a valve or check valve.

In the embodiment of the inventive device shown in FIG. 3, the sealable opening is formed as a gas measurement space pumping device 33. By positioning the piston of the gas measurement space pumping device in a position allowing fluid communication between the first gas measurement space 2 and the second gas measurement space 3, the sealable opening can be opened. By positioning the piston of the gas measurement space pumping device in a position preventing such fluid communication, the sealable opening can be closed. The skilled person may employ a control according to the prior art for positioning the piston. Furthermore, it is possible to bring a defined amount from the first gas measurement space 2 into the second gas measurement space 3 using the gas measurement space pumping device 33.

The first opening 21 is not arranged at the axis of extension 12, so that flow losses occur when introducing the respiratory air from the first gas measurement space 2 into the second gas measurement space 3, which flow losses can be compensated by the suction effect of the gas measurement space pumping device 33.

Figure 4:
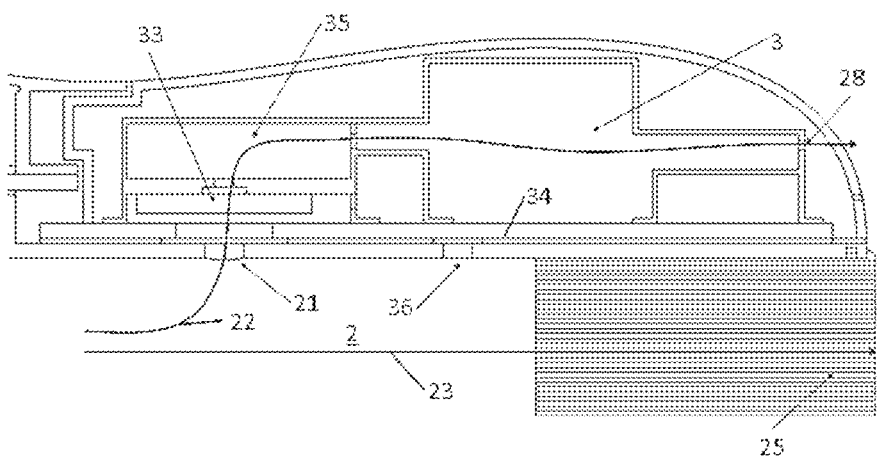
FIG. 4 shows a detailed view of the inventive device.
Figure 5:
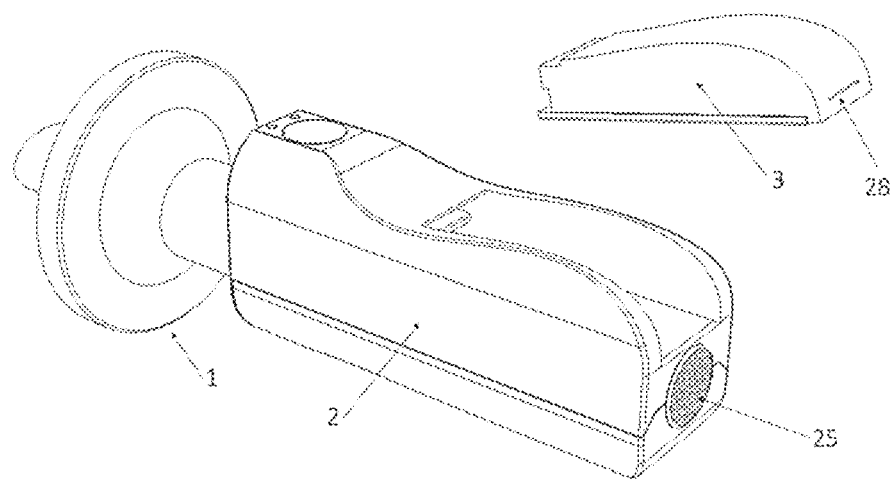
FIG. 5 shows a three-dimensional representation of the inventive device.

FIG. 4 shows a detailed view of the inventive device. A tight layer extends between the first gas measurement space 2 and the second gas measurement space 3, which tight layer is interrupted only at defined points. The tight layer may, for example, be formed as the elastic sealing 34. The second gas measurement space 3 including the sealing may be executed to be detachable from the first gas measurement space 2 by detaching a mechanical connection such as, for example, a latching connection, as represented in FIG. 5. The sealing 34 may be advantageously executed to adhere to the outer surface of the second gas measurement space 3, so that the sealing 34 is replaced as well when the second gas measurement space 3 is replaced.

In the embodiment represented in FIG. 3, the respiratory air is pumped from the first gas measurement space 2 into the second gas measurement space 3 using the gas measurement space pumping device 33. In the process, the respiratory air follows the first flow path 22. The second gas sensors are arranged in the second gas measurement chamber 3, thereby enabling the achievement of the advantageous effects disclosed in the disclosure of the inventive device. The gas measurement space pumping device 33 acts as an opened opening between the first gas measurement space 2 and the second gas measurement space 3, so that the respiratory air can flow from the first gas measurement space 2 into the second gas measurement space 3 following the first flow path 22.

The gas measurement space pumping device 33 may also act as a sealed opening between the first gas measurement space 2 and the second gas measurement space 3, so that the respiratory air flows following the second flow path 23.

The second gas sensors arranged in the second gas measurement space 3 measure the concentrations of certain gases by applying the current teaching depending on the property of the second gas sensors.

The inventive device, in particular the second gas measurement space 3, can be adapted in its shape to the respective second gas sensors due to its spatial separation from the first gas measurement space 2. In order to achieve optimal flushing and thus supplying the respective second gas sensors while taking into consideration the properties of the arranged second gas sensors. The skilled person may, for example, determine the optimal shape of the second gas measurement space 3 by simulations according to the current teaching.

The respiratory air following the first flow path 22 can pass a second gas measurement sub-space 35, in which gas measurement sub-space 35 a prior-art catalyst and/or oxidizer and/or reagent is arranged for oxidizing the nitric oxide to make nitric dioxide. Nitric oxide is present in the respiratory air of patients with known diseases. The second gas measurement sub-space 35 may comprise a permanently open opening towards the second gas measurement space 3.

The second gas measurement space 3 may comprise sub-areas, in which sub-areas control elements are arranged. Preferably, control elements are arranged such that they are permanently separated from the respiratory air. Alternatively to forming sub-areas, the control elements may also be provided with a sealing lacquer layer.

The device shown in FIG. 3 may require further sensors for performing further measurements in addition to the measurement using the second gas sensors arranged in the second gas measurement space 3. The skilled person is in particular able to add or substitute other sensors of the above description to the arrangement of second gas sensors described above.

For example, the skilled person may arrange first gas measurement sensors for measuring the gas concentration of carbon dioxide and/or carbon monoxide in the area of the second opening 24 of the gas measurement space 2, 3. When doing so, the skilled person may arrange first gas sensors, which first gas sensors allow measurement using NDIR methods (nondispersive infrared methods with a first emitter 37 and a first detector 38). In doing so, the skilled person arranges an emitter and a detector on opposite inner surfaces of the first gas measurement space 2. For example, the skilled person forms the first gas measurement space 2 with a round cross section. At best, the skilled person will choose the dimensions of the cross section such that the emitter and the detector can be arranged on the inner surface of the first gas measurement space 2 at a mutual distance optimal for performing the measurement.

In addition to the first opening 21, which first opening 21 constitutes the connection to the second gas measurement space 3, and the second opening 24, to which second opening 24 the mouthpiece 1 is connected, the first gas measurement space 2 can comprise a third opening 25, via which third opening 25 the respiratory air not introduced into the second gas measurement space 3 is released into the surrounding area. Essentially, most of the respiratory air is released via the third opening 25. The pressure in the first gas measurement space 2 and/or the flow in the first gas measurement space 2 may be determined using a first pressure sensor 26 or a flow sensor, which pressure sensor 26 or flow sensor is arranged downstream of the first opening 21 in the direction of the second flow path 23.

In the embodiment represented in FIG. 3, the third opening 25 comprises a plurality of tubules for forming an essentially laminar flow. Said laminar flow advantageously allows determining the pressure in the first gas measurement space 2 using the first pressure sensor 26, since it creates a near-homogeneous pressure distribution in the gas measurement space. Also, the flow can be advantageously determined using the flow sensor. In FIG. 3, only the first pressure sensor 36 is marked; the skilled person may arrange the first flow sensor in place of the first pressure 36.

As shown above, the arrangement of tubules in the third opening is advantageous with respect to the pressure measurement in the third opening 25, but not necessary. By arranging the tubules in the third opening 25 like this, it is also accomplished that the respiratory air introduced when the opening is open follows the second flow path 22, which, as shown above, is also supported by the gas measurement space pumping device 33.

Furthermore, the skilled person arranges a pressure sensor for determining the ambient pressure.

FIG. 5 shows a three-dimensional representation of the inventive device. FIG. 5 illustrates the detachability of the second gas measurement space 3 from the first gas measurement space 2 or of those structural parts which form the respective gas measurement spaces 2, 3. As explained above, it is advantageous to replace the second gas measurement space 3 at a defined number of measurements. The number of measurements may be displayed by a counter.

Furthermore, the mouthpiece 1 is designed to be detachable from the first gas measurement space 2. The skilled person in this case provides a simple plugging connection.

The replaceability of the mouthpiece 1 and/or the second gas measurement space 3 are measures of decontamination, which measures the skilled person can perform while observing guidelines.

The embodiment shown in FIG. 3 is realized as a prototype.

The prototype comprises a replaceable mouthpiece of the CareFusion-MicroGard® IIB type with a bacterial/viral filter.

An optical proximity sensor is used in the prototype for detecting a mouthpiece mounted on the gas measurement space. The VCNL4040 sensor provided by Vishay Semiconductors is employed as the edge switch 29.

An infrared radiator or infrared emitter such as the HSL-EMIRS200_R_60/55_0 emitter provided by Heimann is employed as the first emitter 37 in the prototype. This emitter is characterized by radiating a broad-band, high-performance spectrum in the infrared range.

HTS Multichannel Sensor provided by Heimann or an LRM-244-HDEI-12 sensor provided by InfraTec is used as the first detector 38, for example. As explained above, the concentration of carbon monoxide and/or carbon dioxide can be measured using the NDIR method, in which method these sensors are employed, optionally using filters in the mouthpiece 1.

The control unit 31 of the prototype is preferably formed such that different first emitters 37 and/or first detectors 38 can be employed.

The above prototype comprises a type MZB1001T02 pump provided by Murata as a gas measurement space pumping device.

A sensor for determining temperature and/or humidity and/or pressure is arranged in the second gas measurement space 3. A type BME280 sensor provided by Bosch is employed. As explained above, this sensor is optional; employing this measurement sensor may increase the quality of the measurements.

The second gas sensor is arranged in the second gas measurement space 3 to achieve the advantageous effects mentioned above. In the case of the prototype, a type 4OX sensor provided by SGX Sensortech and/or any SPEC sensor may be arranged in the second gas measurement space 3. Advantageously, the inventive device is formed such that different sensors and/or multiple sensors can be arranged in the second gas measurement space 3.

A type MICS-2714 sensor provided by SGX Sensortech can be arranged additionally or alternatively to the above sensors.

As explained above, measuring pressure and/or temperature and/or humidity in the first gas measurement space 2 is advantageous. It may be required to detect relevant measurement values from spirometry. The measured humidity value in respiratory air may be regarded as evidence of the quality of the measurement performed with the inventive device and optionally as a fault indicator. A type BME280 sensor provided by Bosch is employed in the prototype.

Advantageously, relevant values for the surrounding area, such as temperature and/or humidity and/or pressure are also measured. In the case of the prototype, said measurement is by means of the type BME280 or BMP280 sensor provided by Bosch.

The inventive device may comprise a data communication means such as, for example, a radio connection for transferring the determined data to a data processing apparatus. The data processing apparatus may be a commercially available computer.

Figure 6:
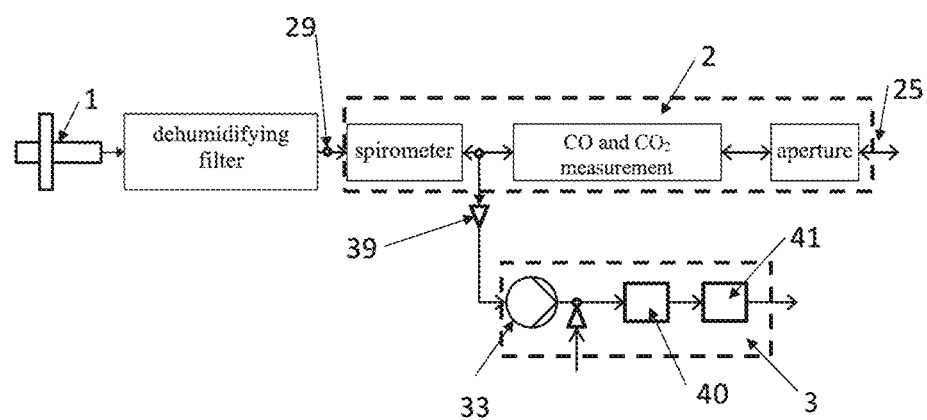
FIG. 6 illustrates, in a block diagram, the individual components of a further prototype.

FIG. 6 illustrates, in a block diagram, the individual components of a further prototype. In addition to the prototype represented in FIGS. 3 through 5, the further prototype comprises check valves 39 at the marked positions. Otherwise, the structure of the further prototype essentially equals the prototype.

The invenetion claimed is:

1. A device for determining measurement values describing a patient's pulmonary or respiratory system function, comprising: a mouthpiece comprising a tube for introducing respiratory air and taking in air; and a gas measurement space; wherein the mouthpiece and the gas measurement space are in fluid communication with one another; wherein the gas measurement space is divided into a first gas measurement space and a second gas measurement space by a sealable opening; wherein at least one first gas sensor for determining first measurement values is arranged in the first gas measurement space, the at least one first gas sensor being one of: a nitric oxide sensor, a carbon dioxide sensor, an oxygen sensor, a carbon monoxide sensor, a multi-gas sensor, a sensor of volatile organic compounds, an alkanes sensor, an infrared sensor, a light wave sensor, a resistance sensor, and a semiconductor sensor; wherein the second gas measurement space is a sealed or sealable space, the sealable opening, when exhaling and thereby introducing respiratory air into the device, releases a first flow path from the first gas measurement space into the second gas measurement space; and wherein at least one second gas sensor for determining second measurement values is arranged in the second gas measurement space, the at least one second gas sensor being one of: a nitric oxide sensor, a carbon dioxide sensor, an oxygen sensor, a carbon monoxide sensor, a multi-gas sensor, a sensor of volatile organic compounds, an alkanes sensor, an infrared sensor, a light wave sensor, a resistance sensor, and a semiconductor sensor.

2. The device of claim 1, wherein a further gas sensor is arranged in the mouthpiece.

3. The device of claim 1, wherein the at least one first gas sensor or the at least one second gas sensor is formed as a resistance sensor or semiconductor sensor that has a carrier body with a carrier body surface, on the carrier body surface isolated tracks with a track surface are arranged, on the track surface a measurement body comprising tetracosane and a binder comprising acrylic copolymer, polyurethane polymer is arranged.

4. The device of claim 1, wherein an additional pressure sensor or flow sensor is arranged in at least one of the first gas measurement space and the second gas measurement space, the pressure sensor or flow sensor can be used to determine air impulse measurement values describing the air impulse volume introduced into the gas measurement space using at least one of the pumping device and by inhaling or exhaling.

5. The device of claim 1, wherein the device comprises a pumping device, wherein the pumping device is in fluid communication with the gas measurement space for introducing an air impulse volume into the gas measurement space.

6. The device of claim 5, wherein the pumping device comprises a membrane compressor, wherein the pumping device comprises a compressor volume connected to the gas measurement space, wherein the compressor volume is compressible by a membrane that can be set in membrane oscillation.

7. The device of claim 6, wherein the membrane oscillation is 1-50 Hz.

8. The device of claim 5, wherein the pumping device comprises a rotary vane pump with at least one of a rotor and a piston pump with a piston, wherein the pumping device comprises a compressor volume connected to the gas measurement space, wherein the compressor volume is compressible by rotation of the rotor or by movement of the piston, respectively.

9. The device of claim 5, wherein a displacement volume of at most 100.0 milliliters can be introduced into the gas measurement space via a third opening.

10. The device of claim 1, wherein the sealable opening comprises at least one of a valve, a check valve, and a gas measurement space pumping device.

11. The device of claim 1, wherein the sealable opening, when inhaling and thereby drawing air from the device, releases a second flow path from a gas measurement space inlet in fluid communication with a surrounding area into the first gas measurement space.

12. The device of claim 1, wherein the mouthpiece comprises at least one of a viral filter and an air dehumidifier.

13. The device of claim 1, wherein the device comprises at least one of:
    a first temperature sensor arranged in the first gas measurement space; and
    a second temperature sensor arranged in the second gas measurement space.

14. The device of claim 1, wherein the device comprises at least one of:
    a first humidity sensor arranged in the first gas measurement space; and
    a second humidity sensor arranged in the second gas measurement space.

15. The device of claim 1, wherein the device comprises at least one of:
    a pressure sensor for determining the ambient barometric pressure of a surrounding area of the device;
    a gas sensor for determining the gas composition of the ambient gas of the surrounding area of the device;
    a temperature sensor for determining the ambient temperature of the surrounding area of the device; and
    a humidity sensor for determining the ambient humidity of the surrounding area of the device.

16. The device of claim 1, wherein substances with a medical effect can be introduced via a gas measurement space inlet.

17. The device of claim 1, wherein at least one of a heating device and a cooling device for respectively heating or cooling the air introduced into at least one of the gas measurement space and the sensors is arranged in a gas measurement space inlet.

18. The device of claim 1, wherein the device comprises a data communication means for transferring the data determined using the sensor to a data processing apparatus.

19. The device of claim 1, wherein the device comprises a counter.

20. A method of determining at least one of the following diseases of a patient's lungs or respiratory system by applying a device of claim 1:
   infection of the lungs, COPD, fibroses, asthma, lung cancer, and infection of sub-areas of a patient's airways.

21. The method of claim 20, wherein:
the method is computer-implemented; and
a pattern of measurement values is determined over a length of time by determining a similarity measure, the pattern of measurement values being compared to a further pattern of further measurement values, at least one of the further pattern and the further measurement values being stored in a database.

* * * * *